2,654,617

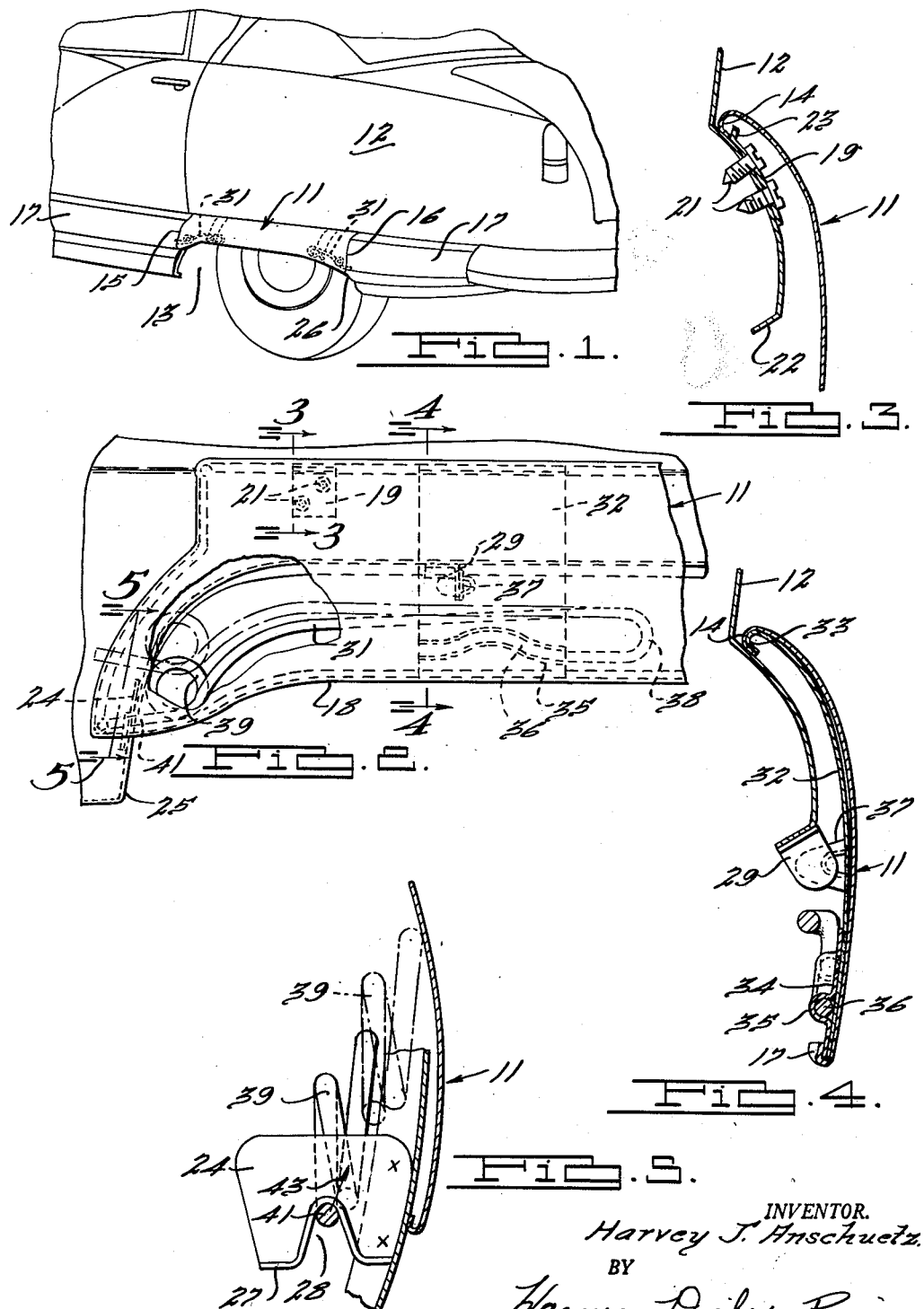
Oct. 6, 1953     H. J. ANSCHUETZ     2,654,617
FENDER SKIRT
Filed June 19, 1950
INVENTOR.
Harvey J. Anschuetz
BY
Harness, Dickey & Pierce
ATTORNEYS Patented Oct. 6, 1953

UNITED STATES PATENT OFFICE 2,654,617

FENDER SKIRT

Harvey J. Anschuetz, Plymouth, Mich., assignor to Kaiser-Frazer Corporation, Willow Run, Mich., a corporation of Nevada Application June 19, 1950, Serial No. 169,001

3 Claims. (Cl. 280—153)

1

This invention relates to covers for wheel access openings in the bodies of automotive vehicles, and particularly to trim shields or skirts for the wheel access openings in the sides of fenders.

In conventional devices of this nature, difficulty is experienced by the average motorist because of the complicated attaching means which require considerable effort in installing and removing the fender shields. Another shortcoming of conventional fender skirts is that the means provided for attaching the skirt to the fender body is nonyieldable, so that when the skirt receives a sudden impact, for instance from a stone kicked up by the adjacent wheel, the nonresiliency of the mounting will often result in kinking of the skirt panel.

It is, therefore, an object of the present invention to provide a wheel access opening cover for automotive vehicles which is simple and easy to assemble and remove, and which, furthermore, may be simply installed on a vehicle.

It is a further object of this invention to provide a fender skirt as described which has resilient means for attachment to the fender opening, these means being manually operated so that no tools are required, either in the assembly or the removal of the skirt.

It is also an object to provide such a skirt having guide means thereon for aligning the skirt over the fender opening in proper position to engage the attaching means therewith.

It is a further object to provide a fender skirt having means for yieldably attaching it to the fender, whereby the fender skirt will be capable of movement upon receiving an impact, and to thereafter return to its normal secured position.

It is also an object of this invention to provide a fender skirt trim panel which may be so shaped as to blend with the adjacent portions of the vehicle, and which is particularly adapted to blend with the side rub rail mouldings thereof.

Other objects of the invention will be apparent from the following specification, the drawing relating thereto, and from the claims hereinafter set forth.

In the drawings, in which like numerals are used to designate like parts in the several views throughout:

Figure 1 is a perspective view of a portion of a vehicle showing the improved fender skirt in place;

Fig. 2 is an elevational view of a portion of the fender skirt and the adjacent fender, showing the attaching means and associated elements of the device;

Fig. 3 is a cross-sectional view taken along the

2 line 3—3 of Fig. 2 and showing the upper supporting means for the skirt;

Fig. 4 is a cross-sectional view taken along the line 4—4 of Fig. 2 and showing the spring-retaining means and lateral stop; and Fig. 5 is a cross-sectional view taken along the line 5—5 of Fig. 2 and showing the cooperation of the resilient attaching means with the fender body.

The fender skirt comprises, in general, a panel 11 which, when in operative position, will overlap the marginal portions of a fender 12 which surrounds the wheel access opening 13, as shown in Fig. 1. The panel 11 is preferably shaped with an outward concavity, best seen in Figs. 3 and 4, and with a hooked or top edge 14. The side edges 15 and 16 are so shaped as to match the adjacent edges of rub rail mouldings 17, and are flanged inwardly so that, when the fender skirt is in its operative position, the contour thereof will blend with that of the rub rail mouldings. The lower edge 18 of the skirt may be shaped so as to blend gracefully with the portion of the wheel access opening which remains uncovered.

In order to retain the fender skirt on the fender body, the latter is provided with a pair of upper supporting brackets 19, one of which is shown in Fig. 2. As shown in Fig. 3, each of these brackets is rigidly secured to the fender body by means of screws 21, a short distance above the flanged marginal edge 22 of the wheel access opening. The upper edge 23 of each of these brackets extends outwardly away from the fender surface, to allow the upper inturned edge 14 of the fender skirt to be securely supported thereon. This engagement, as will be later seen, prevents downward movement of the fender skirt 11 relative to fender 12, while simultaneously allowing the lower portion of the skirt to move in a direction normal to the fender.

In addition to brackets 23, the fender body is also provided with a pair of clips 24, one of which is shown in Fig. 2, and which are adjacent the flanged side marginal edges 25 and 26 of the wheel access opening. Each of these clips extends inwardly normal to the plane of the opening 13, and the flanged lower edge 27 of each clip has a recess 28 of substantially inverted U shape. The fender is also provided with a pair of lateral stops 29, one of which is shown in Fig. 2, and which are attached to the flanged marginal edge 22 of the wheel access opening. As best seen in Figs. 2 and 4, these stops extend outwardly normal to the plane of the wheel access opening.

Mounted in each end portion of the fender skirt 11 on the inner face thereof is an elongated spring element 31 comprising a rod of circular cross-section, which, as will be seen, serves to engage the adjacent side of the fender skirt with the fender body. Each of these elements is preferably mounted in the fender skirt by a retaining member 32 which comprises a cover retainer plate having edges 33 secured respectively by the upper and lower inturned edges 14 and 17 of the panel, and a spring retainer plate 34 overlying the lower portion of plate 33. The lower edge of plate 34 is secured by the lower edge 17 of the panel, and the plate has a recess or channel 35 pressed inwardly thereon, the recess being of offset shape and retaining therein the offset inner end portion 36 of the spring rod 31. The spring retainer plate 34 may be spot-welded or otherwise secured to cover retainer plate 32, and the end 36 of spring 31 is thus firmly anchored between the plate against lateral or longitudinal movement. The intermediate portion of each plate 34 has pressed outwardly therefrom an ear 37 which, as will be later seen, cooperates with stop 29 when the fender skirt is being installed.

The spring member 31 extends parallel to the plane of the fender skirt and the intermediate portion thereof is bent in a U shape, as shown at 38, the portion of the spring above the U bend extending toward the adjacent side edge of the fender skirt. Near its outer end member 31 is bent into a loop 39, which is preferably of a size convenient for manual grasping. The member extends past the loop, the outer terminal 41 thereof forming a toe which, as will be seen, is engageable in recess 28 of the clip 24. The outer end of spring member 31 will, when in its unrestrained condition, occupy a position adjacent the inner surface of the skirt, as shown by the dot-dash lines in Figs. 2 and 5.

In order to install the fender skirt, the upper edge 14 thereof is first engaged on brackets 19, and the skirt is adjusted until it is substantially in the position shown in Figures 3 and 4. The skirt may be slid laterally on brackets 19, in order to position ears 37 against their corresponding stops 29. This will insure that toes 41 of springs 31, when moved downwardly and inwardly, will be in position to enter recesses 28. The operator then grasps loops 39, pulling the springs downwardly and inwardly until the toes are engaged in the recesses. The fender skirt is now securely held in position, since springs 31 will urge the fender skirt downwardly against the action of brackets 19. Since these springs in their unrestrained condition are adjacent the inner surface of the fender skirt, as seen in Fig. 5, their retention in recesses 28 will also cause a force component normal to the plane of the fender to keep the skirt flush thereagainst. The resultant of the force components may be indicated by the arrow 43, shown in Fig. 5.

It will be observed that because of the novel arrangement of the mounting means, any impact on the fender skirt, especially an impact on the inner surface thereof, will be yieldably resisted by the action of springs 31.

In order to remove the fender skirt, it is merely necessary to grasp loops 39, pulling toes 41 out of recesses 28. The skirt may then be lifted from supporting brackets 23 and removed from the fender.

What is claimed is:

1. As an article of manufacture, a fender skirt comprising an elongated panel, hooked means along said panel adjacent one edge thereof and adapted to engage a fender, a pair of elongated spring members on said panel spaced from said one edge, retaining means for securing the inner ends of said spring members to said panel, each of said securing means comprising a cover retaining plate having upper and lower edges fixed to said panel, a spring retainer plate overlying said cover retainng plate and secured thereto, the inner ends of said spring members being anchored between said retainer plates, and an ear extending normally from each of said cover retaining plates, said ears being in spaced longitudinal relationship and positioned between said hooked means and said spring members.

2. In combination, a first panel having an opening along one edge thereof, a second panel for covering said opening, and means for detachably securing said second panel across said opening, said last-named means comprising a bracket on said first panel and engageable with said second panel, a pair of spring members on said second panel and operatively engageable with said first panel on opposite sides of said opening, means on said first panel for limiting movement of said second panel parallel to said opening, retaining means for said spring members, each of said retaining means comprising a retaining plate on said second panel, one portion of said retaining plate having means for rigidly securing said spring member, and an ear on said retaining plate adapted for engagement with said stop means.

3. As an article of manufacture, a fender skirt comprising an elongated panel, hooked means along said panel adjacent one edge thereof and adapted to engage a fender, a pair of elongated spring members on said panel spaced from said one edge, each of said spring members having an inner end fixed to said panel and an outer end adapted to engage said fender, the means for fixing said spring members to the panel comprising retaining means for securing the inner ends of said spring members, each of said retaining means comprising a cover retaining plate having upper and lower edges fixed to said panel, and a spring retainer plate overlying said cover retaining plate and secured thereto, the inner ends of said spring members being anchored between said retainer plates.

HARVEY J. ANSCHUETZ.

References Cited in the file of this patent

UNITED STATES PATENTS

| Number | Name | Date |
|---|---|---|
| 1,995,774 | Moore | Mar. 26, 1935 |
| 2,257,556 | Webb | Sept. 30, 1941 |
| 2,267,421 | Purdy | Dec. 23, 1941 |
| 2,334,867 | Fergueson | Nov. 23, 1943 |
| 2,460,349 | Hessler | Feb. 1, 1949 |
| 2,560,601 | Schatzman | July 17, 1951 |
| 2,572,774 | Smith et al. | Oct. 23, 1951 |